Sept. 5, 1944.   J. F. RONDINONE   2,357,689
INSIDE MICROMETER
Filed Jan. 21, 1943
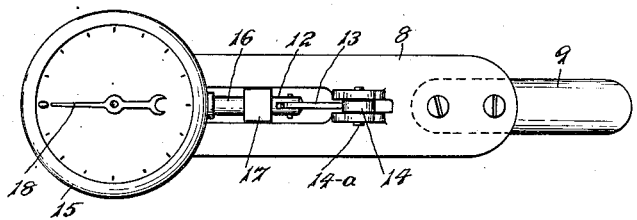
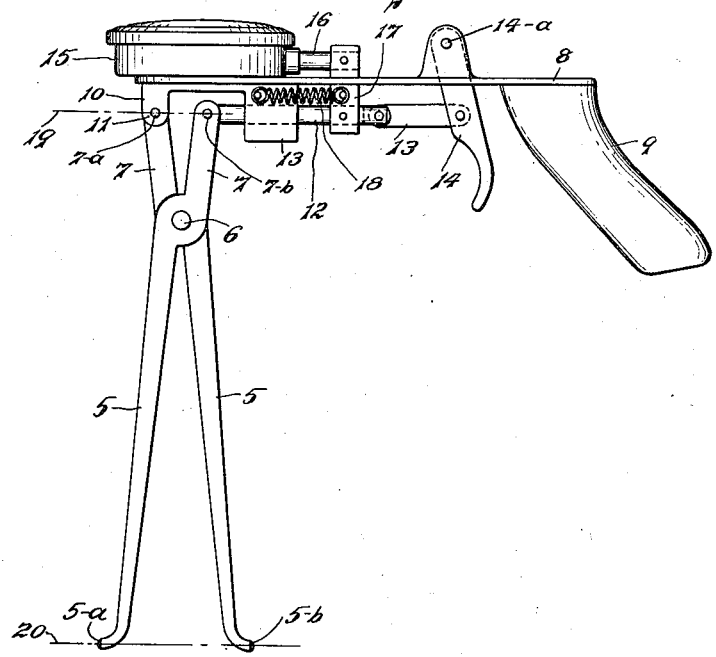
INVENTOR.
JOSEPH F. RONDINONE.
BY
Louis V. Lucia
ATTORNEY.

Patented Sept. 5, 1944

2,357,689

UNITED STATES PATENT OFFICE 2,357,689

INSIDE MICROMETER

Joseph F. Rondinone, Wethersfield, Conn., assignor of one-fourth to Winifred C. Rondinone, Wethersfield, Conn.

Application January 21, 1943, Serial No. 473,088

12 Claims. (Cl. 33—148)

This invention relates to inside micrometers and particularly to micrometers of the caliper type.

The primary object of the invention is to provide such a micrometer having an indicator and which is operated by a trigger mechanism for quick and accurate readings.

A further object of the invention is to provide a micrometer using a conventional form of a caliper and micrometer indicator both of which are operated simultaneously by means of a finger actuated mechanism which will move the calipers to measuring position and the indicator to indicating position.

Further objects and advantages of my invention will be more clearly understood from the following description and from the accompanying drawing in which:

Fig. 1 is a plan view of a micrometer embodying my invention.

Fig. 2 is a side view thereof.

As shown in the drawing, my improved micrometer comprises a pair of calipers having legs 5—5 pivoted at 6 and with extensions 7.

The operating mechanism, consists of a frame 8 having a handle 9 and a block 10 secured thereto. One of the extensions 7 is pivoted, as at 7—a, to the bracket 11 on said block and the other extension 7 is pivotally connected, as at 7—b, to a slide bar 12 which slides in the bracket 13 also on said block 10. The said bar 12 is connected by means of a link 13 to a trigger 14 which is pivoted at 14—a on the frame 8.

An indicator 15, of conventional form, is mounted on the plate 8 and has a plunger, or operating bar, 16 projecting therefrom which is connected to the operating bar 12 by means of a connector 17.

A spring 18 is preferably anchored upon the block 10 and connected to said strap for urging the entire mechanism towards its normal position.

In the mechanism shown, the ratio between the relative movement of the pivotal points 7—a and 7—b and that between the relative movement of the measuring points 5—a and 5—b is four to one. Therefore, the said points 5—a and 5—b will move a relative distance of one inch to a one-fourth inch movement between the points 7—a and 7—b. This permits the use of a smaller indicator instrument and operating mechanism and thereby provides highly desirable features in the manufacture and use of the inside micrometer illustrated in the drawing.

In the operation of my improved micrometer, the entire device is held by means of the handle 9 with the index finger of the user extending across the trigger 14.

For measuring distances, the legs 5, 5 of the calipers are simply inserted between the points to be measured and the trigger 14 is pulled. This causes the said legs to spread until they engage the points to be measured and, at the same time, the indicator 15 to be operated so that the pointer 18 will indicate the distance or measurement taken on the dial of the indicator.

My invention renders possible the use of an indicator with a conventional form of dial having evenly spaced graduations and alleviates the need for a dial with variably spaced graduations; this by reason of the fact that the relative movement of the pivotal points 7—a and 7—b is maintained on a line, as indicated at 19, which is at all times parallel to a line, as indicated at 20, extending through the measuring points 5—a and 5—b of the legs 5, 5 so that a constant ratio is maintained between the movement of the said measuring points and pivotal points.

I claim:

1. An inside micrometer comprising a frame, a caliper construction including a pair of intermediately pivotal leg members, an indicator supported on said frame, one of said leg members being pivotally connected to said frame, the other leg member being connected to said indicator, and means including a separate lever pivoted on said frame for simultaneously operating said leg members and indicator.

2. An inside micrometer of the character described comprising a frame, a caliper construction including a pair of intermediately pivoted leg members, an indicator, a bracket depending from said frame, one of said leg members being pivotally connected to said bracket, a bar slidable in said frame and pivotally connected to the other leg member, a trigger pivoted in said frame and connected to said bar for operating the same to cause the operation of said calipers, an operating plunger on said indicator, and connecting means between said bar and plunger for operating said indicator simultaneously with said calipers.

3. An inside micrometer of the character described comprising a frame, a caliper construction including a pair of intermediately pivoted leg members, an indicator, a bracket depending from said frame, one of said leg members being pivotally connected to said bracket, a bar slidable in said frame, a link between said trigger and bar to the other leg member, a trigger pivoted in said frame and connected to said bar for operating the bar to cause the operation of said leg members, an operating plunger on said indicator connected to said slidable bar, and spring means urging said operating bar to cause movement of said leg members and indicator.

4. An inside micrometer comprising a frame having mounted thereon a pair of pivotally connected leg members, an indicator having a plunger for operating the same, a slidable bar for operating said leg members and plunger, a trigger, and a link connection between said trigger and bar for operating said bar.

5. An inside micrometer mechanism of the character described comprising a frame having mounted thereon a caliper construction including a pair of intermediately pivoted leg members with one of said members pivotally mounted on said frame, a slidable member pivotally connected to the other leg member, spring means anchored on said frame and urging said slidable member in one direction, and a trigger member pivoted on said frame and linked with said slidable member for moving it in an opposite direction.

6. An inside micrometer comprising a frame, a caliper construction including a pair of leg members disposed perpendicularly to said frame, one of said leg members being pivotally connected to said frame, a dial indicator mounted upon said frame, a bar slidable in said frame and connected to the other of said leg members, means operatively connecting said bar with said indicator, a link extending from said bar, a trigger member pivoted on said frame and connected to said link for operating said bar to cause simultaneous operation of said calipers and indicator, and a handle adjacent to said trigger member for supporting said frame.

7. An inside micrometer of the character described comprising a frame having a horizontally disposed indicator mounted thereon, a caliper construction including a pair of intermediately pivoted leg members depending from said frame perpendicular to said indicator, one of said leg members being pivoted to said frame, a member slidable in said frame and pivotally connected to the other leg member, a lever pivoted to said frame and connected to said slidable member for operating said leg members, and a connection between said slidable member and said indicator for simultaneously operating the indicator upon the operation of said leg members.

8. An inside micrometer comprising a frame having mounted thereon a pair of pivotally connected leg members, a handle on said frame, a trigger member, an indicator having a plunger for operating the same, a slidable bar for operating said leg members and plunger, and a link connecting said trigger member and bar for operating said leg members and indicator.

9. A micrometer of the character described comprising a supporting frame, a pair of pivotally connected leg members pivotally mounted on said frame and depending therefrom, a bar connected to said leg members and slidably mounted in said frame, an indicator supported on said frame and having an operating plunger movable parallel to the axis of said bar, a connection between said bar and plunger, and trigger means for moving said bar to simultaneously operate said leg members and indicator.

10. An indicator of the character described including a frame having a slot therein and a handle for supporting the said frame, an indicator mounted on the top of said frame and having an operating plunger extending therefrom, a pair of pivotally connected leg members depending from said frame, a bearing portion in said frame, a member slidable in said bearing portion and connected to said leg members for operating the same, means extending through said slot for connecting said slidable member with said plunger, and trigger means adjacent to said handle and linked to said slidable member for simultaneously operating said leg members and indicator.

11. An indicator of the character described comprising a frame having a handle thereon, a pair of pivotally connected leg members depending from said frame, an indicator having a dial horizontally disposed on said frame, an operating plunger extending from said indicator, means slidable in said frame for simultaneously operating said leg members and plunger, trigger means pivotally mounted on said frame and positioned adjacent to said handle, and a link member connecting said trigger means with said slidable operating means.

12. An indicator of the character described comprising a supporting frame having a horizontal portion with a handle depending therefrom, an indicator including a dial mounted on said frame and facing upwardly from said horizontal portion, a pair of pivotally connected legs depending from said frame under said indicator, one of said legs being pivotally mounted in said frame and the other leg member being pivotally connected to an operating member slidable in the frame, a connection between said operating member and plunger, a trigger lever pivoted to said frame and depending through a slot therein to a position adjacent to said handle, and a link connecting said trigger member with said operating member for simultaneously operating said indicator and leg members.

JOSEPH F. RONDINONE.